(12) United States Patent
Hoersch et al.

(10) Patent No.: US 12,128,966 B2
(45) Date of Patent: Oct. 29, 2024

(54) SLIDING BEARING BUSHING FOR A STEERING SYSTEM

(71) Applicant: Robert Bosch GmbH, Stuttgart (DE)

(72) Inventors: Juergen Hoersch, Gschwend (DE); Armin Nagel, Boebingen an der Rems (DE); Jan Beck, Schwaebisch Hall (DE); Stephanus Sebastiaan Bester, Jena (DE); Karl-Heinz Urban, Spraitbach (DE); Bjoern Volpp, Schwaebisch Gmuend (DE); Christian Held, Schwaebisch Gmuend (DE); Matthias Buerckert, Schwaebisch Gmuend (DE)

(73) Assignee: Robert Bosch GmbH, Stuttgart (DE)

( * ) Notice: Subject to any disclaimer, the term of this patent is extended or adjusted under 35 U.S.C. 154(b) by 765 days.

(21) Appl. No.: 17/295,545

(22) PCT Filed: Nov. 19, 2019

(86) PCT No.: PCT/EP2019/081719
§ 371 (c)(1),
(2) Date: May 20, 2021

(87) PCT Pub. No.: WO2020/109066
PCT Pub. Date: Jun. 4, 2020

(65) Prior Publication Data
US 2022/0001918 A1 Jan. 6, 2022

(30) Foreign Application Priority Data

Nov. 27, 2018 (DE) .................... 10 2018 220 314.8

(51) Int. Cl.
*B62D 5/04* (2006.01)
*F16C 17/02* (2006.01)
*F16C 33/06* (2006.01)

(52) U.S. Cl.
CPC .......... *B62D 5/0424* (2013.01); *B62D 5/0448* (2013.01); *F16C 17/02* (2013.01); *F16C 33/06* (2013.01); *F16C 2326/01* (2013.01)

(58) Field of Classification Search
CPC ..... B62D 5/0424; B62D 5/0448; F16C 17/02; F16C 33/06; F16C 2326/01
See application file for complete search history.

(56) References Cited

U.S. PATENT DOCUMENTS

| 8,240,422 B2 * | 8/2012 | Yamasaki | B62D 7/146 180/407 |
| 2012/0097470 A1 | 4/2012 | Yamasaki et al. | |
| 2013/0055845 A1 * | 3/2013 | Rombold | B62D 5/12 74/493 |

FOREIGN PATENT DOCUMENTS

| CN | 2859063 Y | 1/2007 |
| CN | 101535666 A | 9/2009 |

(Continued)

OTHER PUBLICATIONS

International Search Report corresponding to PCT Application No. PCT/EP2019/081719, mailed Jan. 23, 2020 (German and English language document) (6 pages).

*Primary Examiner* — Kevin Hurley
*Assistant Examiner* — Michael R Stabley
(74) *Attorney, Agent, or Firm* — Maginot, Moore & Beck LLP

(57) ABSTRACT

The disclosure relates to a steer-by-wire system for a motor vehicle including a steering rod, an electric servo unit configured to move the steering rod, and a sliding bearing which radially supports the steering rod in a housing. The housing, the sliding bearing, and the steering rod have complementary geometries whereby the steering rod is prevented from rotating. The sliding bearing includes multiple segments in the circumferential direction, at least one (Continued)

segment of the multiple segments is a sliding bearing location for the radial support. At least one segment of the multiple segments is a first supporting element configured to prevent rotation in one direction of rotation. At least one segment of the multiple segments is a second supporting element configured to prevent rotation in the opposite direction of rotation.

6 Claims, 3 Drawing Sheets

(56) References Cited

FOREIGN PATENT DOCUMENTS

| | | |
|---|---|---|
| CN | 103717443 A | 4/2014 |
| CN | 104685238 A | 6/2015 |
| DE | 10 2010 024 847 A1 | 12/2011 |
| DE | 10 2013 107 827 A1 | 1/2015 |
| DE | 10 2015 206 455 A1 | 9/2016 |
| DE | 10 2016 114 970 A1 | 2/2018 |
| EP | 3 214 326 A1 | 9/2017 |
| EP | 3 299 253 A1 | 3/2018 |
| FR | 2 674 646 A1 | 10/1992 |
| FR | 2 749 258 A1 | 12/1997 |
| JP | 2003-63414 A | 3/2003 |
| KR | 10-0854763 B1 | 8/2008 |
| WO | 2009/011287 A1 | 1/2009 |
| WO | 2018/029289 A1 | 2/2018 |

* cited by examiner

SLIDING BEARING BUSHING FOR A STEERING SYSTEM

This application is a 35 U.S.C. § 371 National Stage Application of PCT/EP2019/081719, filed on Nov. 19, 2019, which claims the benefit of priority to Serial No. DE 10 2018 220 314.8, filed on Nov. 27, 2018 in Germany, the disclosures of which are incorporated herein by reference in their entirety.

The present invention disclosure relates to a steer-by-wire system for a motor vehicle having a sliding bearing.

The present disclosure relates to a steer-by-wire system for a motor vehicle having a sliding bearing.

BACKGROUND

In electric power assisted steering systems which are embodied with a servo unit featuring axially parallel driving of the rack, the electric motor is situated axially parallel to the rack. Power assistance is transmitted directly to the rack by means of a ball screw having a belt drive.

The steering inputs of the driver are transmitted via the steering column to the steering gear, which converts the rotation of the steering shaft into a linear motion of the rack by means of a rack and pinion connection.

Now, owing to the ball screw, a torque around the longitudinal axis of the rack is also introduced into the rack, and this must be resisted. Prevention of rotation and, in addition, support for the rack is provided by the rack and pinion connection.

In a steering system based on the steer-by-wire principle, the steering inputs of the driver are now only communicated to the servo unit electrically. There is no longer direct mechanical drive from the steering handle to the steering rod. The rack and pinion connection together with a thrust piece is no longer necessary since the gear functionality implemented at this location is no longer required. However, the functions of rotation prevention and support for the rack which are implemented at this location will also be required in future.

It is therefore the object of the disclosure to provide a solution by means of which, on the one hand, the steering rod is radially supported and, in addition, is prevented from rotating.

On the other hand, it should be possible to adjust these functions as independently from one another as possible in order to adapt them in this way to the various requirements.

This object is achieved by the teaching of the disclosure in that the sliding bearing is divided into different segments, depending on function. A pure sliding bearing function is implemented on one or more segments. The rotation prevention function is implemented on other segments. According to the disclosure, the functions are implemented separately by different segments. Thus, each segment can be optimized for the defined function. Connecting elements that give the sliding bearing a guiding-supporting structure can be arranged between these functional segments.

The sliding bearing can have at least one radial projection and/or a recess, which extends in an axial direction on the sliding bearing and which comprises one or more segments. A sliding bearing location can be arranged on the projection/depression, i.e. at the highest elevation or lowest depression thereof. The supporting elements can be arranged on the sides of the projection or of the recess. A supporting element which acts when the rack is rotated clockwise can be arranged on a first side of the projection or of the recess. A further supporting element, which acts when the rack is rotated counterclockwise, can be arranged on the other side of the projection or of the recess.

The supporting elements are composed of an elastic material and can deflect under loading. In a preferred embodiment, the supporting elements consist of a curved spring sheet, which has one or more curves. The amplitude, wavelength, width and sheet thickness of the curves can be defined precisely in accordance with requirements.

The curve is compressed as a function of load during loading and poses a defined resistance to the deformation. In the limiting case, the curve is even completely flattened, thereby giving rise to flat surface contact. Depending on the material and in terms of geometry, the curve should be configured in such a way in the design process that, even when pressed flat, no plastic deformations result and hence the curve rises again almost completely in a reversible manner after the load is relieved.

BRIEF DESCRIPTION OF THE DRAWINGS

One embodiment of the disclosure is now described with reference to the figures, of which.

DETAILED DESCRIPTION

Figure 1:
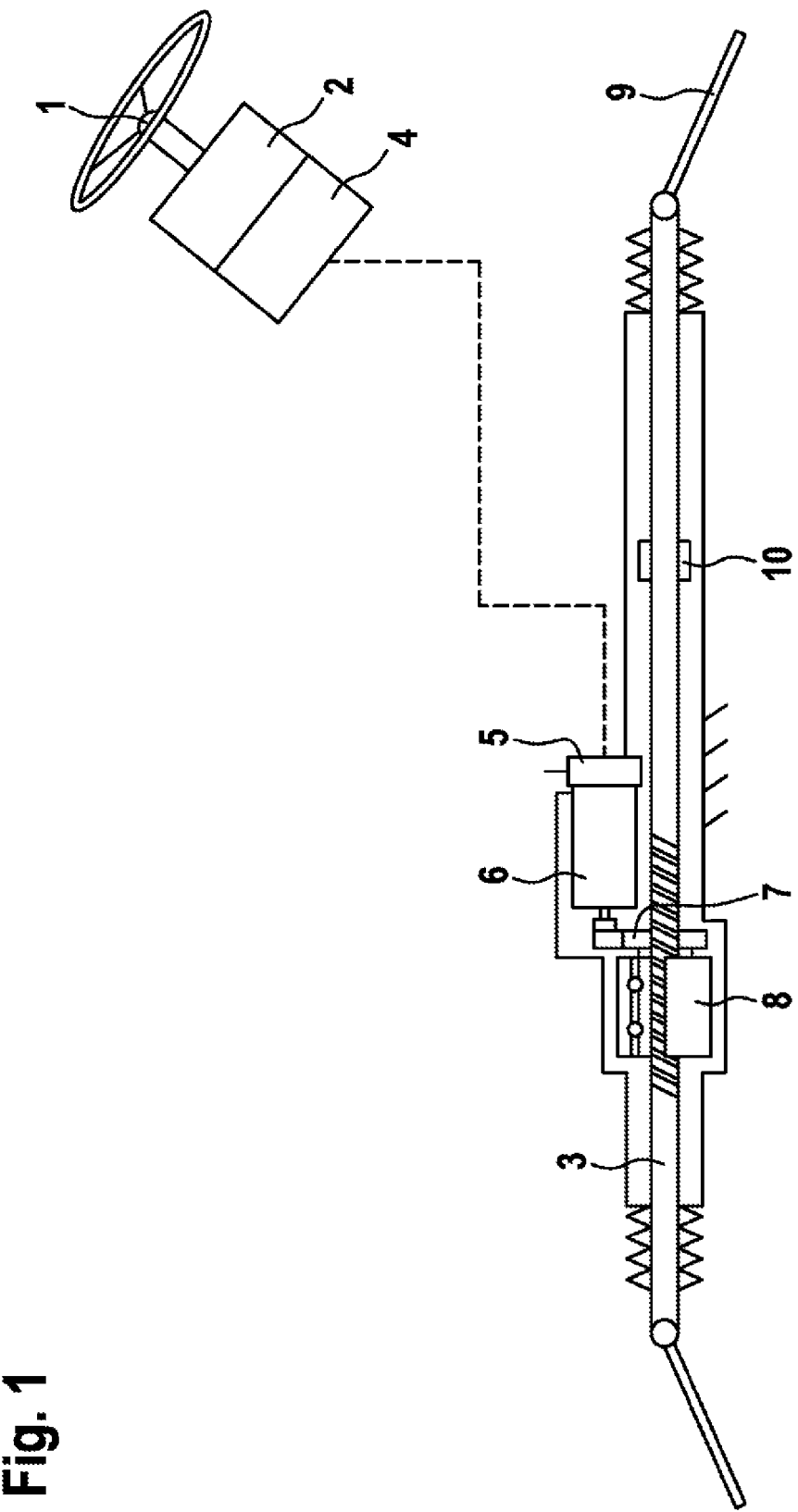
FIG. 1 shows a schematic illustration of a steering system of a vehicle

FIG. 1 shows a schematic illustration of a steer-by-wire system of a vehicle. The steering commands are recorded by a sensor 4 at the steering input unit with a steering wheel 1 and a force feedback motor 2. The signals are transmitted to a control device 5, which is situated on the lower assembly, the steering rack actuator. The control device 5 controls the servo motor 6, which drives the ball screw via a belt transmission 7, whereby ultimately the steering rod 3 is moved. The steering rod 3 adjusts the steering angle at the wheels via the tie rods 9. The steering rod 3 is supported by the sliding bearing 10 according to the disclosure.

Figure 2:
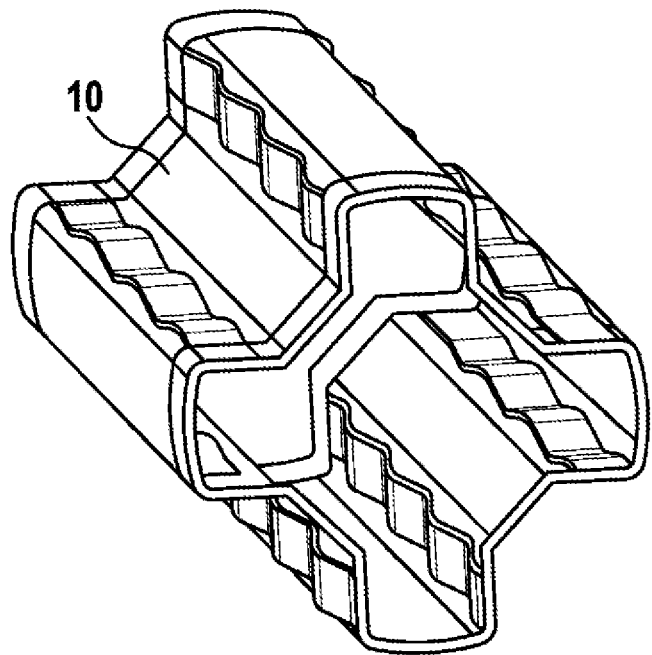
FIG. 2 shows a perspective view of the sliding bearing according to the disclosure

FIG. 2 shows the sliding bearing 10 according to the disclosure. It can be seen that the sliding bearing in this embodiment is of clover leaf-shaped configuration in cross section, that is to say, for example, has four projections. The projections are uniformly distributed over the circumference. The uniform distribution makes it possible to achieve a virtual pair of forces, thereby ensuring that there is freedom from transverse forces, and hence the resulting frictional forces in the longitudinal direction of the rack are significantly reduced.

FIG. 2 shows the sliding bearing 10 according to the invention. It can be seen that the sliding bearing in this embodiment is of clover leaf-shaped configuration in cross section, that is to say, for example, has four projections. The projections are uniformly distributed over the circumference. The uniform distribution makes it possible to achieve a virtual pair of forces, thereby ensuring that there is freedom from transverse forces, and hence the resulting frictional forces in the longitudinal direction of the rack are significantly reduced.

Figure 3:
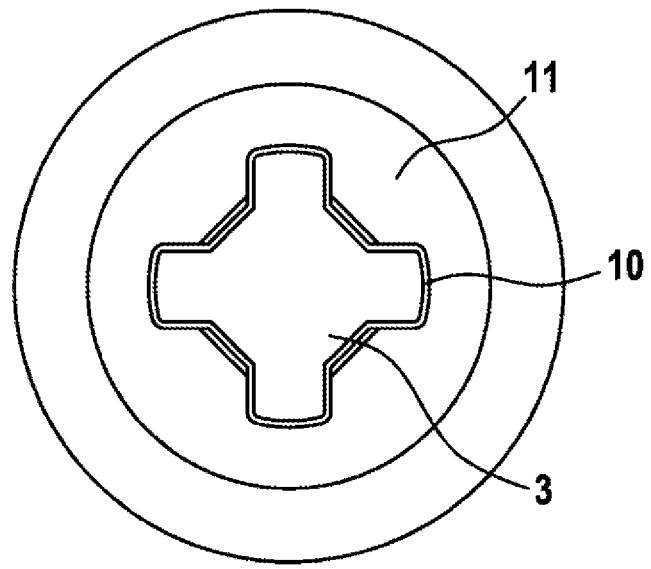
FIG. 3 shows the sliding bearing according to the disclosure in the installed state

The clover leaf-shaped cross-sectional shape of the sliding bearing is also readily apparent in FIG. 3, which shows the sliding bearing 10 in the installed state. The sliding bearing 10 is arranged between the steering rod 3 and the housing 11.

Figure 4:
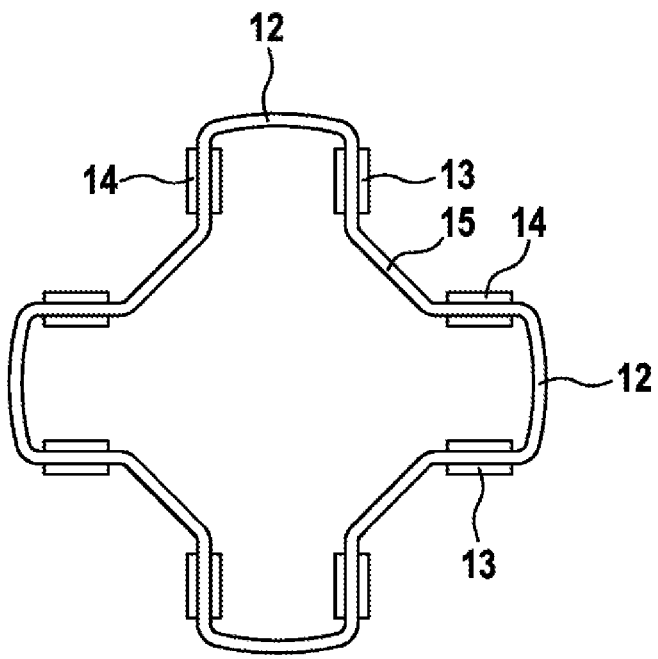
FIG. 4 shows the sliding bearing according to the disclosure

FIG. 4 shows the sliding bearing in an enlarged view. A sliding bearing location 12 is arranged in each case on the projection or on a highest elevation. The contour of the sliding bearing location 12 is laterally arc-shaped. The arc-shaped design allows relative rotation of the steering rod about the longitudinal axis thereof in the sliding bearing, which means that no rotation prevention function is implemented at this location or that this function is affected. The sliding bearing locations 12 thus contribute purely to the function of radial support.

The supporting elements 13, 14 are arranged on the sides of a projection. On a first side of the projection, it is possible to arrange a supporting element 13 which acts when the steering rod is rotated clockwise. On the other side of the projection, it is possible to arrange a further supporting element 14, which acts when the rack is rotated counterclockwise.

The supporting elements 13, 14 are composed of an elastic material and can deflect under loading. As can be seen in FIG. 2, the supporting elements 13, 14 consist of a curved spring sheet, which has a plurality of curves. The amplitude, wavelength, width and sheet thickness of the curves can be defined precisely in accordance with requirements.

Between the projections there are connecting elements 15. These are used only as a guiding-supporting structure and do not necessarily have contact with the steering rod and the housing. The sliding bearing is delimited at its two ends by connecting rings. These two are merely part of the supporting structure and are not necessarily in contact with the steering rod.

The stiffness properties of the supporting elements 13, 14 can be set in accordance with requirements. For this purpose, each supporting element is given a suitable curvature. For example, the steering rod can be provided with a stronger spring action in the upward direction than in the downward direction.

The supporting elements 13, 14 can also contribute to the radial bearing function. This can be employed and used selectively through the choice of bearing clearance in the sliding bearing locations 12 in combination with the stiffness behavior of the supporting elements 13, 14. If, for example, a very small bearing clearance is chosen in the sliding bearing location 12 and the spring action of the supporting elements 13, 14 is very soft, this effect is negligible. If the bearing clearance in the sliding bearing location 12 is very large and the spring action of the supporting elements 13, 14 is very stiff, this effect assists radial support. In this case, a person skilled in the art must identify the optimum for the respective application.

Figure 5:
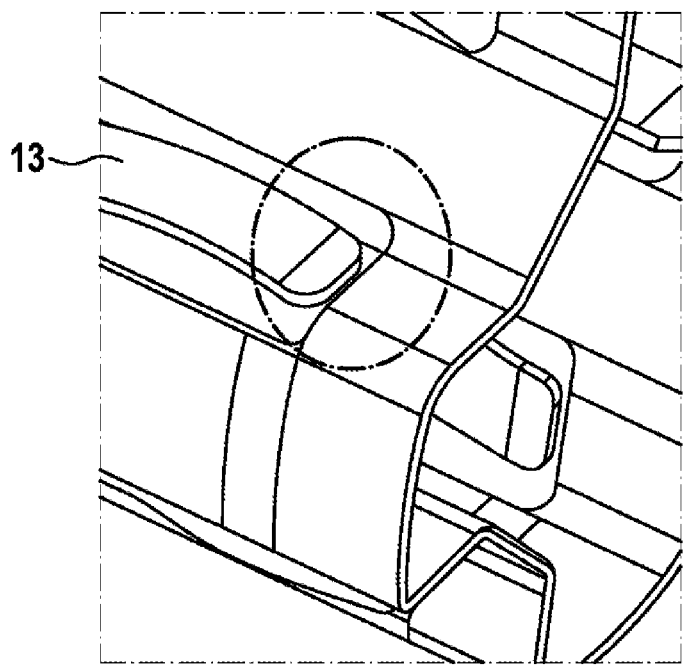
FIG. 5 shows a detail view of the sliding bearing according to the disclosure

The supporting elements 13, 14 provided with curves can increase in length when compressed, which may lead to stresses in the sliding bearing if they are secured on both sides. FIG. 5 therefore shows an embodiment in which the supporting element 13 is attached on only one side.

The invention claimed is:

1. A steer-by-wire system for a motor vehicle, comprising:
   a steering rod;
   an electric servo unit configured to move the steering rod; and
   a sliding bearing which radially supports the steering rod in a housing, wherein
   the housing, the sliding bearing, and the steering rod have complementary geometries whereby the steering rod is prevented from rotating,
   the sliding bearing includes multiple segments in the circumferential direction,
   at least one first segment of the multiple segments is a sliding bearing location for the radial support,
   at least one second segment of the multiple segments is a first supporting element configured to prevent rotation in one direction of rotation,
   at least one third segment of the multiple segments is a second supporting element configured to prevent rotation in the opposite direction of rotation, and
   the first and second supporting elements comprise an elastic material and are configured to deflect under loading.

2. The steer-by-wire system as claimed in claim 1, wherein:
   the sliding bearing has at least one radial projection, which comprises a plurality of the multiple segments;
   a sliding bearing location is arranged on the at least one projection; and
   at least one of the first and second supporting elements is arranged laterally on the at least one projection.

3. The steer-by-wire system as claimed in claim 1, wherein:
   the sliding bearing has at least one radial recess, which comprises a plurality of the multiple segments;
   the sliding bearing location is arranged in the at least one radial recess; and
   at least one of the first and second supporting elements is arranged laterally on the at least one radial recess.

4. The steer-by-wire system as claimed in claim 1, wherein:
   the sliding bearing has at least one radial projection and one radial recess, which each comprise a respective plurality of the multiple segments;
   the sliding bearing location is arranged on at least one of the projection and the recess; and
   at least one of the first and second supporting elements is arranged laterally on at least one of the projection and the recess.

5. The steer-by-wire system as claimed in claim 1, wherein the first and second supporting elements each include a respective curved spring sheet.

6. The steer-by-wire system as claimed in claim 5, wherein the first and second supporting elements include respective spring sheets are each secured on only one side.

* * * * *